United States Patent
Toba et al.

(10) Patent No.: US 7,586,770 B2
(45) Date of Patent: Sep. 8, 2009

(54) INTERCONNECTION INVERTER DEVICE

(75) Inventors: Masahiro Toba, Tokyo (JP); Noriyuki Matsubara, Tokyo (JP); Masanori Kageyama, Tokyo (JP); Naoki Nishio, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 36 days.

(21) Appl. No.: 11/578,464

(22) PCT Filed: Feb. 24, 2006

(86) PCT No.: PCT/JP2006/303464

§ 371 (c)(1),
(2), (4) Date: Oct. 13, 2006

(87) PCT Pub. No.: WO2007/096994

PCT Pub. Date: Aug. 30, 2007

(65) Prior Publication Data

US 2007/0291522 A1 Dec. 20, 2007

(51) Int. Cl.
 *H02M 7/53862* (2007.01)
 *H02H 7/122* (2006.01)
(52) U.S. Cl. ............... 363/97; 363/56.05; 323/266
(58) Field of Classification Search ............ 363/55, 363/56.01, 56.02, 56.05, 95, 98, 131, 132, 363/26.02, 97; 361/16, 56, 86, 91.1; 323/266
See application file for complete search history.

(56) References Cited

U.S. PATENT DOCUMENTS

| 4,760,483 | A | | 7/1988 | Kugelman |
| 4,885,654 | A | | 12/1989 | Budyko |
| 4,914,355 | A | * | 4/1990 | Mertens et al. ............. 315/307 |
| 5,295,036 | A | * | 3/1994 | Yagi et al. ...................... 361/79 |
| 5,303,140 | A | * | 4/1994 | Shimizu ...................... 363/132 |
| 5,771,163 | A | * | 6/1998 | Moriguchi et al. ............ 363/71 |
| 6,031,738 | A | * | 2/2000 | Lipo et al. .................... 363/37 |
| 7,068,010 | B2 | * | 6/2006 | Youm ......................... 318/778 |
| 7,084,638 | B1 | * | 8/2006 | Kramer et al. .............. 324/548 |
| 7,355,869 | B2 | * | 4/2008 | Okamura .................... 363/132 |
| 2004/0165408 | A1 | | 8/2004 | West |
| 2008/0304298 | A1 | * | 12/2008 | Toba et al. ............... 363/56.01 |

FOREIGN PATENT DOCUMENTS

DE 2252434 A1 5/1974

(Continued)

OTHER PUBLICATIONS

Extended European Search Report dated Mar. 10, 2009, (7 pages).

(Continued)

*Primary Examiner*—Gary L Laxton
(74) *Attorney, Agent, or Firm*—Buchanan Ingersoll & Rooney PC

(57) ABSTRACT

An interconnection inverter device includes a pair of capacitors connected in series to a pair of direct-current buses each connecting a direct-current power supply and the inverter; an opening/closing unit connected to either one of the pair of direct-current buses; voltage monitor units that monitor terminal voltages of the pair of capacitors respectively; and a controller that controls opening or closing of the opening/closing unit based on monitor voltages detected by the voltage monitor units.

9 Claims, 3 Drawing Sheets

FOREIGN PATENT DOCUMENTS

| | | |
|---|---|---|
| EP | 0299069 A | 1/1989 |
| JP | 05-030561 A | 2/1993 |
| JP | 2001-136755 A | 5/2001 |
| JP | 2001-186664 A | 7/2001 |
| JP | 2002-91586 A | 3/2002 |
| JP | 2002-335632 A | 11/2002 |
| JP | 2005-295648 A | 10/2005 |
| JP | 2005-350465 A | 12/2005 |
| WO | WO 2004/010557 A | 1/2004 |

OTHER PUBLICATIONS

International Search Report for PCT/JP2006/303464, dated Mar. 14, 2006, in Japanese.

Written Opinion on PCT/JP2006/303464, dated Mar. 14, 2006, in Japanese.

* cited by examiner

INTERCONNECTION INVERTER DEVICE

TECHNICAL FIELD

The present invention generally relates to an inverter device. The present invention specifically relates to an interconnection inverter device for interconnecting direct-current power from a solar cell, a fuel cell, or the like, to an alternating-current power system.

BACKGROUND ART

Interconnection inverter devices for interconnecting with an alternating-current power system include a smoothing unit for stabilizing a voltage of input direct-current power. The smoothing unit has conventionally been configured by using an electrolytic capacitor for high power.

On the one hand, among interconnection inverter devices in which the direct-current power is an output of a solar cell, an interconnection inverter device with a high-voltage specification, such that an input voltage reaches even 700 VDC, requires a product with a high-breakdown voltage of about 850 WV (working voltage) allowing for derating as a breakdown voltage of an electrolytic capacitor for smoothing.

However, the electrolytic capacitor with such a high-breakdown voltage is not common in terms of its cost and configuration, and it is, therefore, difficult to be adopted into home electric appliances. Based on this background, the high-breakdown voltage is ensured in the interconnection inverter devices each with a high-voltage specification by serially connecting low-cost, high-availability two general-purpose electrolytic capacitors of about 450 WV or 500 WV.

There are few documents, related to the interconnection inverter device, which directly disclose measures against problems for this type of electrolytic capacitors. This is because it is thought common that circuit operation of a converter circuit or of an inverter circuit is directly stopped as safety measures upon device malfunction.

On the other hand, there is Patent document 1 as follows as a document which discloses not safety measures for protecting the device but safety measures for persons handling the device.

The Patent document 1 takes up the problem such that a service person may get a shock under a condition as follows, and discloses an interconnection inverter device as measures against the problem. The condition is such that he/she may get a shock upon operation of a detection function for preventing the device from being destroyed caused by overvoltage or overcurrent occurring inside the interconnection inverter device, because the device is in the stopped state in which the charge in an output capacitor connected to a final stage of the device is not being discharged. And the interconnection inverter device, disclosed as the measures against it, stops an oscillation operation of a booster converter and of the inverter as soon as possible when the overvoltage or the overcurrent occurs inside the device, and quickly discharges the charge from the output capacitor connected to the final output stage of the device.

Patent document 1: Japanese Patent Application Laid-Open No. 2001-186664

DISCLOSURE OF INVENTION

Problem to be Solved by the Invention

Because the general-purpose electrolytic capacitor with high-breakdown voltage has generally 450 WV or 500 WV, it is necessary to ensure a desired breakdown voltage by serially inserting two electrolytic capacitors of, for example, 450 WV to between 700-VDC input lines of the interconnection inverter device.

On the other hand, if any unexpected event occurs, that is, if a short-circuit fault occurs in either one of the two electrolytic capacitors connected in series, a voltage exceeding the breakdown voltage is applied to the other electrolytic capacitor, and burst may inevitably occur. The electrolytic capacitor where the burst has occurred causes blowout of gas or liquid leakage. This brings about a problem that the blowout of gas or the like badly affects other circuits and deteriorates other circuit components, and also a fear that the blowout of gas or the like may lead to fire of the device under flammable bad environment.

The present invention has achieved to solve at least the problems in the conventional technology, and it is an object of the present invention to provide an interconnection inverter device capable of detecting anomaly in an electrolytic capacitor and safely stopping the device.

Means for Solving Problem

To solve the above problems, and to achieve the above objects, according to an aspect of the present invention, an interconnection inverter device that includes an inverter for converting direct-current power supplied from a direct-current power supply to alternating-current power and that interconnects an output of the inverter to an alternating-current power system includes a pair of capacitors connected in series to a pair of direct-current buses each connecting the direct-current power supply and the inverter; a switch unit connected to either one of a positive bus and a negative bus that constitute the pair of direct-current buses; a pair of voltage monitor units each of which detects a terminal voltage of a corresponding one of the pair of capacitors; and a controller that controls the switch unit based on a terminal voltage detected by at least one of the voltage monitor units.

EFFECT OF THE INVENTION

The interconnection inverter device according to the present invention includes a pair of capacitors connected in series between a pair of direct-current buses each connecting the direct-current power supply and the inverter, and controls opening or closing of the opening/closing unit inserted to either one of the positive-electrode-side bus and the negative-electrode-side bus based on the monitor voltages obtained by monitoring terminal voltages of the pair of capacitors. Therefore, even if a short-circuit fault occurs in a capacitor, it is possible to prevent a situation, which may arise, where a high voltage is applied to a normal capacitor, and to safely stop the device.

EXPLANATIONS OF LETTERS OR NUMERALS

1 Interconnection inverter device
5, 6, 7 Bus
11 Solar cell
12 Relay
13, 18a, 18b Switching element (IGBT)
14 Switching element controller
15a, 15b, 15c, 20a, 20b Capacitor
16a, 16b Voltage monitor unit
17a, 17b Coil
19a, 19b Diode
21 Inverter
22 CPU
25 Converter

BEST MODE(S) FOR CARRYING OUT THE INVENTION

Exemplary embodiments of an interconnection inverter device according to the present invention are explained in detail with reference to the accompanying drawings. The present invention is not to be limited by these embodiments. Moreover, the circuit configurations explained below are exemplary, i.e., it is possible for a person skilled in the art to modify the circuit configurations without departing from the technical spirit of the present invention.

First Embodiment

Figure 1:
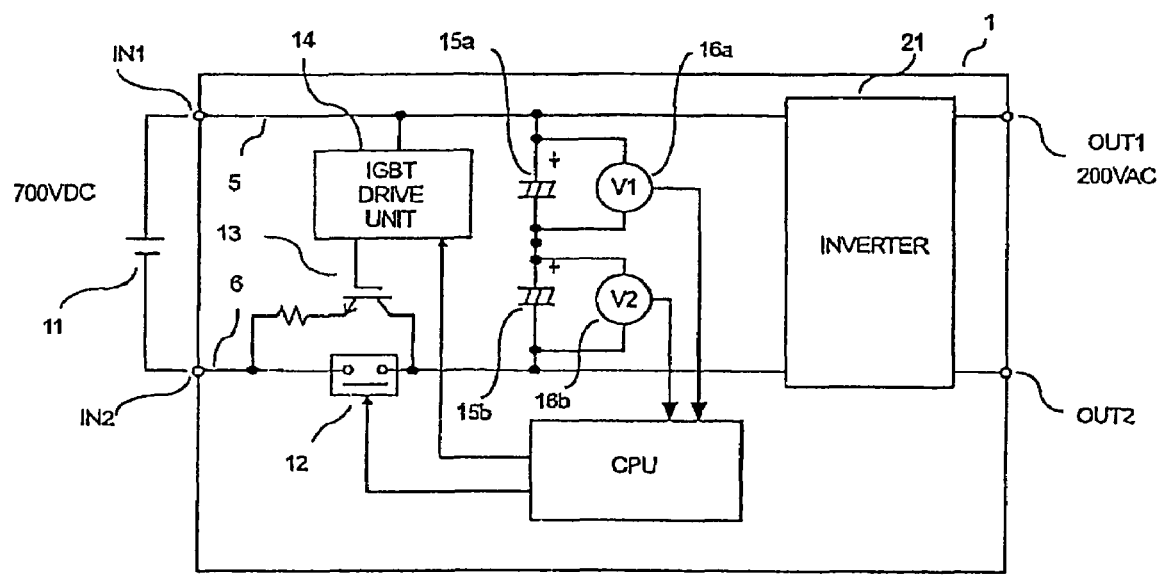
FIG. 1 is a circuit diagram of an interconnection inverter device according to a first embodiment of the present invention.

FIG. 1 is a circuit diagram of an interconnection inverter device 1 according to a first embodiment of the present invention. The interconnection inverter device 1 is configured as a power system in such a manner that its input terminals IN1 and IN2 are connected to a solar cell 11 which is a direct-current power supply and power is interconnected to an alternating-current power system (not shown) through its output terminals OUT1 and OUT2 which are alternating current output terminals. In the solar cell 11 as the direct-current power supply, serial and parallel combinations of cells can arbitrarily be configured. Therefore, an output voltage can be set in a wide range from tens of VDC to hundreds of VDC.

The circuit configuration of the interconnection inverter device 1 according to the first embodiment shown in FIG. 1 is explained below. The interconnection inverter device 1 includes component units such as an inverter 21, a switching element 13 such as IGBT (Insulated Gate Bipolar Transistor); a switching element controller 14 that controls the switching element 13; a relay 12; capacitors 15a and 15b such as an electrolytic capacitor; voltage monitor units 16a and 16b that monitor voltages of the capacitors 15a and 15b respectively; and a CPU 22 as a controller that controls the relay 12 and the switching element controller 14.

The inverter 21 is connected at its input terminals to a bus 5 being a direct-current bus on a positive-electrode side and to a bus 6 being a direct-current bus on a negative-electrode side, and is connected at its output terminals to the output terminals OUT1 and OUT2 respectively to interconnect with the alternating-current power system. The capacitor 15a and the capacitor 15b are connected in series to be inserted between the bus 5 and the bus 6. The relay 12 is inserted to the bus 6, and a first terminal (e.g., collector of IGBT) and a second terminal (e.g., emitter of IGBT) of the switching element 13 are connected to the bus 6 so that the relay 12 is sandwiched by the terminals. Furthermore, one end of the switching element controller 14 is connected to a control end (base of IGBT) of the switching element 13 to control on/off of the switching element 13. The CPU 22 communicates with such component units as the voltage monitor units 16a and 16b, the switching element controller 14, and the relay 12 so as to control the switching element controller 14 and the relay 12 based on monitor voltages by the voltage monitor units 16a and 16b.

The operation of the interconnection inverter device 1 is explained below. The voltage monitor units 16a and 16b monitor respective voltages of the capacitors 15a and 15b connected in series, and output the monitor voltages detected to the CPU 22. For example, if a short-circuit fault occurs in the capacitor 15a, the monitor voltage (voltage of the capacitor 15b) of the voltage monitor unit 16b becomes a predetermined threshold (e.g., 400 VDC) or more, and the voltage exceeding the threshold is detected by the CPU 22. At this time, the CPU 22 controls the relay 12 inserted to the bus 6 to be turned off. The supply of the direct-current power from the solar cell 11 is shut off through the control, and the operation of the device to be safely stopped.

In this manner, the interconnection inverter device 1 forms a capacitor protection circuit when electrolytic capacitors with low breakdown voltage connected in series are used for a high voltage unit, and is characterized as follows. That is, each voltage of the capacitors connected in series is monitored, and if a short-circuit fault occurs in either one of the capacitors, then it is detected that the voltage of the other capacitor becomes the threshold or more, and the relay inserted to the input line is controlled to be turned off.

Although the switching element 13 is connected to the bus 6 in addition to the configuration of the relay 12 in the above manner, the main purpose of this configuration is to protect contact points of the relay 12. In other words, according to the present invention, a purpose that the device is safely stopped can be achieved without the switching element 13, but in terms of the protection of the contact points of the relay 12, it is effective to control the switching element 13 as explained in the following.

As shown in FIG. 1, for example, when a short-circuit fault occurs in the capacitor 15a, the monitor voltage of the capacitor 15b becomes the predetermined threshold or more, and it is detected by the CPU 22. At this time, it is preferable that the CPU 22 first control the relay 12 to be turned off while the on-state of the switching element 13 is maintained, and then, control the switching element 13 to be turned off. On the other hand, for example, when the capacitor 15a having failed the short circuit is replaced to recover the interconnection inverter device 1, it is preferable that the CPU 22 first control the switching element 13 to be turned on, complete charging to the capacitors 15a and 15b, and then, control the relay 12 to be turned on. These controls allow prevention of contact-point degradation due to direct-current arc of the relay 12. Moreover, these controls allow the solar cell 11 and the capacitors 15a and 15b to be connected when an output voltage of the solar cell 11 is low, to thereby suppress an inrush current to the capacitors 15a and 15b. By monitoring the output voltage of the solar cell 11, the switching element 13 can be automatically turned on, for example, when the output voltage of the solar cell 11 is low, and this enables suppression of the inrush current to the capacitors.

During the processes, it is determined whether a terminal voltage of a capacitor, different from the capacitor having failed the short circuit, or a voltage at a connecting terminal, to which the capacitor is connected, has exceeded a predetermined threshold (first threshold). But, it may be determined whether a terminal voltage of the capacitor having failed the short circuit or a voltage at a connecting terminal to which the capacitor is connected is below a predetermined threshold (second threshold) which is different from the first threshold. Furthermore, it is possible to control a voltage using both the first threshold and the second threshold. The flow in this case is shown in FIG. 2.

Figure 2:
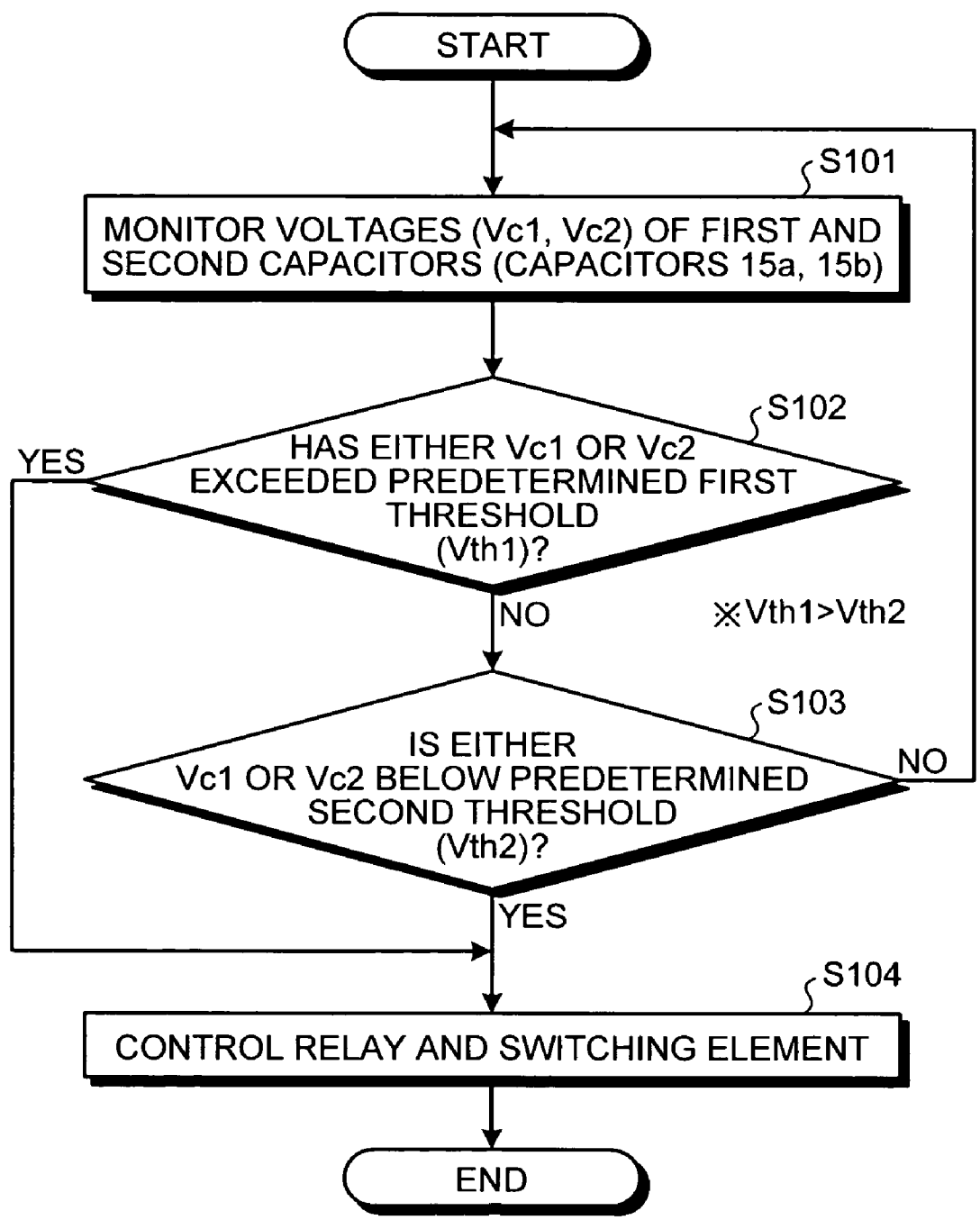
FIG. 2 is a flowchart of a process for controlling the interconnection inverter device shown in FIG. 1 using first and second thresholds.

In FIG. 2, the voltage monitor unit 16a monitors a terminal voltage (Vc1) of the capacitor 15a, while the voltage monitor unit 16b monitors a terminal voltage (Vc2) of the capacitor 15b (step S101). The CPU 22 determines whether each of monitor voltages (Vc1, Vc2) of the capacitors 15a and 15b has exceeded the predetermined first threshold (Vth1) (step S102). If it is determined that either one of the monitor voltages (Vc1, Vc2) has exceeded the predetermined first threshold (Vth1) (step S102, Yes), the control is performed on the relay 12 and the switching element 13 (step S104). On the other hand, if it is determined that neither of the monitor voltages (Vc1, Vc2) has exceeded the predetermined first threshold (Vth1) (step S102, No), then it is determined whether each of the monitor voltages (Vc1, Vc2) is below the predetermined second threshold (Vth2) (step S103). If it is determined that either one of the monitor voltages (Vc1, Vc2) is below the predetermined second threshold (Vth2) (step S103, Yes), then the process at step S104 is executed. If it is determined that neither of the monitor voltages (Vc1, Vc2) is below the predetermined second threshold (Vth2) (step S103, No), then the process proceeds to step S101, where monitoring of each terminal voltage of the capacitors is continued.

In the flow, the order of the processes at step S102 and step S103 may be interchanged with each other. Furthermore, either one of the processes at step S102 and step S103 can be omitted.

As explained above, in the interconnection inverter device 1, a pair of capacitors connected in series is inserted between a pair of direct-current buses each connecting the solar cell and the inverter, and opening or closing of the opening/closing unit inserted to either the positive-electrode-side bus or the negative-electrode-side bus is controlled based on the monitor voltages obtained by monitoring terminal voltages of the pair of capacitors. Therefore, even if a short-circuit fault occurs in a capacitor, it is possible to prevent the situation, which may arise, where a high voltage is applied to a normal capacitor, and to safely stop the device.

In the configuration of FIG. 1, a large amount of inrush current is about to flow from a high-voltage (e.g. 700 VDC) solar cell to a capacitor with almost zero voltage upon turning on the device, but, for example, by inserting a desired resistor to the emitter side or the collector side of the switching element 13, it is possible to suppress the large amount of inrush current. Even if the resistor is inserted to the switching element, the switching element is turned on and then the relay connected in parallel thereto is turned on, and a switching element circuit is thereby bypassed. Therefore, the insertion of the resistor does not lead to an increase in loss.

In the circuit configuration of FIG. 1, the relay 12 and the first and the second terminals of the switching element 13 are inserted or connected to the bus 6 being the direct-current bus on the negative-electrode side, but may be inserted or connected to the bus 5 being the direct-current bus on the positive-electrode side.

Second Embodiment

Figure 3:
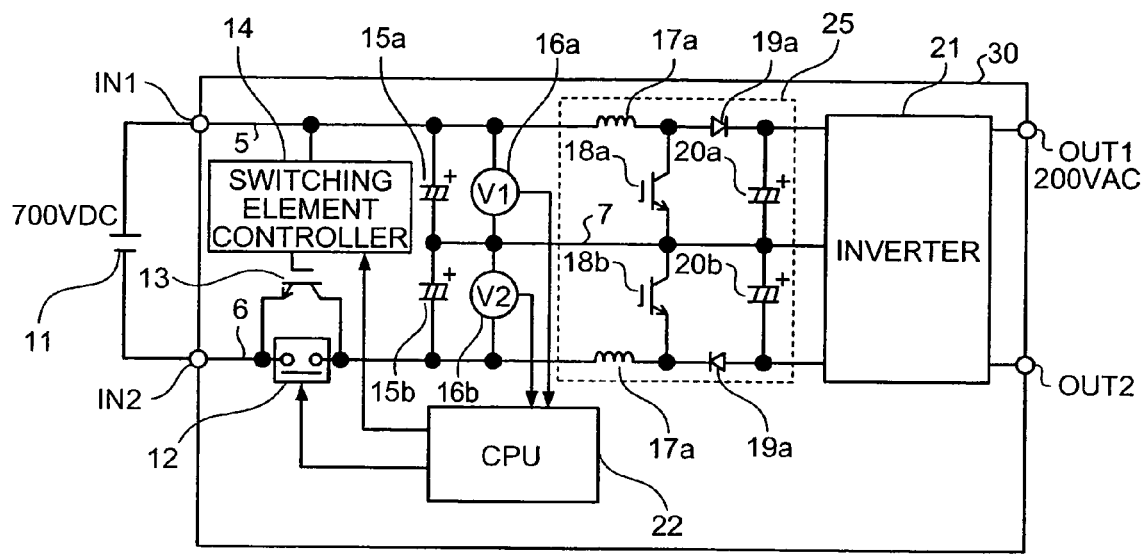
FIG. 3 is a circuit diagram of an interconnection inverter device according to a second embodiment of the present invention.

FIG. 3 is a circuit diagram of an interconnection inverter device 30 according to a second embodiment of the present invention. The interconnection inverter device 30 is configured, based on the configuration according to the first embodiment of FIG. 1, to include a converter 25, which changes (to boost voltage and/or to step down voltage) an input voltage supplied from the solar cell 11, provided in the input stage of the inverter 21. The rest parts of the configuration are the same as or equivalent to these of the configuration according to the first embodiment shown in FIG. 1, and therefore, the same reference numerals are assigned to those component units, and explanation thereof is omitted.

In FIG. 3, the converter 25 includes coils 17a and 17b, switching elements 18a and 18b such as IGBT, diodes 19a and 19b, and capacitors 20a and 20b. In the converter 25, the switching element 18a and the switching element 18b are connected in series to be inserted between the bus 5 and bus 6, and the capacitor 20a and the capacitor 20b are connected in series to be inserted between the bus 5 and the bus 6 at connection points closer to the side of the inverter 21 than those of the switching elements 18a and 18b. The diode 19a is inserted between connection points of the switching element 18a and the capacitor 20a on the bus-5 side so that a direction in which a current (direct current) flows is a forward direction of its own. The diode 19b is inserted between connection points of the switching element 18b and the capacitor 20b on the bus-6 side so that a direction in which a current (direct current) flows is a forward direction of its own. The coil 17a is inserted between connection points of the switching element 18a and the capacitor 15a on the bus-5 side, while the coil 17b is inserted between connection points of the switching element 18b and the capacitor 15b on the bus-6 side. Elements of the capacitors 15a and 15b, those of the switching elements 18a and 18b, and those of the capacitors 20a and 20b are connected to connection points respectively, and the connection points are connected to a common bus 7.

In FIG. 3, when a short-circuit fault occurs in either one of the switching elements 18a and 18b arranged in parallel with the capacitors 15a and 15b respectively, the capacitor 15a or the capacitor 15b connected in parallel with a switching element having failed the short circuit is short-circuited by the relevant switching element. This causes the same situation as that of the first embodiment to occur. In this case also, by performing control in the same manner as that of the first embodiment, the operation of the interconnection inverter device 30 can be safely stopped.

Furthermore, in the converter 25, when a short-circuit fault occurs in either one of the capacitors 20a and 20b arranged in parallel with the switching elements 18a and 18b respectively, the capacitor 15a or the capacitor 15b connected in parallel with a capacitor having failed the short circuit is short-circuited by the relevant capacitor. This causes the same situation as that explained above to occur. In this case also, by performing control in the same manner as that of the first embodiment, the operation of the interconnection inverter device 30 can be safely stopped.

The converter 25 as shown in FIG. 3 indicates the circuit configuration when each voltage stored in the capacitors 15a and 15b is boosted, but the configuration is not limited by this. Therefore, even if a circuit that steps down the voltages stored in the capacitors 15a and 15b or a circuit that boosts/steps down the voltages is connected to the converter 25, it is obvious that this circuit can be applied in the same manner as above.

As explained above, in the interconnection inverter device 30, even if the converter that boosts and/or steps down an input voltage supplied from the solar cell is provided, opening or closing of the opening/closing unit can be controlled in the same manner as that of the first embodiment based on a terminal voltage of the capacitor monitored, and the same effect as that of the first embodiment is obtained.

Third Embodiment

Figure 4:
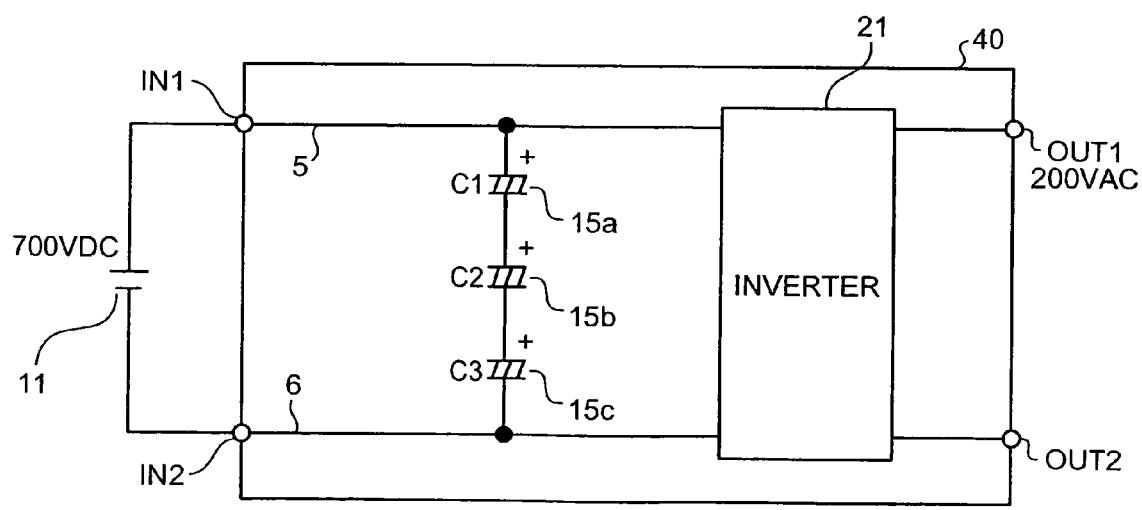
FIG. 4 is a circuit diagram of an interconnection inverter device according to a third embodiment of the present invention.

FIG. 4 is a circuit diagram of an interconnection inverter device 40 according to a third embodiment of the present invention. The interconnection inverter device 40 is configured, based on the configuration according to the first embodiment of FIG. 1, so that three or more capacitors (three in the example of FIG. 4) are inserted between the bus 5 and the bus 6. The rest parts of the configuration are the same as or equivalent to these of the configuration according to the first embodiment shown in FIG. 1, and therefore, the configuration except the main component units is omitted from FIG. 4, and explanation thereof is omitted.

In FIG. 3, the capacitors 15a, 15b, and a capacitor 15c (C1, C2, C3) are connected in series to be inserted between the bus 5 and the bus 6. Based on this configuration, even if a short-circuit fault occurs in any one of the capacitors, the breakdown voltage can be ensured by the remaining two capacitors. If three or more capacitors are connected, the breakdown voltage can be ensured by the remaining two or more capacitors.

For example, in the case of a high voltage specification such that an output voltage of the solar cell 11 is 700 VDC, the whole breakdown voltage of the capacitors 15a, 15b, and 15c connected in series requires a product with a high-breakdown voltage of about 850 WV allowing for derating and the like. On the other hand, by serially connecting low-cost, high-availability three general-purpose electrolytic capacitors of about 450 WV, even if a short-circuit fault occurs in one of the capacitors, a breakdown voltage of 900 WV as a total breakdown voltage of the remaining two capacitors can be ensured. Therefore, a wider selection is provided such that the operation of the device can be continued in addition to stopping of the device. Based on the configuration in the above manner, a capacitor having failed can be fixed at any time when it is convenient for a user or a repair person, which allows improvement of the operation rate and the reliability of the device.

As explained above, in the interconnection inverter device 40, a capacitor group including three or more capacitors connected in series is inserted between a pair of direct-current buses each connecting the direct-current power supply and the inverter. And opening or closing of the opening/closing unit inserted to either the positive-electrode-side bus or the negative-electrode-side bus is controlled based on each monitor voltage obtained by monitoring each terminal voltage of the capacitor group. Therefore, even if a short-circuit fault occurs in a capacitor, it is possible to prevent the situation, which may arise, where a high voltage is applied to a normal capacitor, and to safely stop the device.

INDUSTRIAL APPLICABILITY

As can be seen, the interconnection inverter device according to the present invention is useful as an interconnection inverter device for interconnecting direct-current power from the solar cell, the fuel cell, or the like, to an alternating-current power system. And it is particularly suitable for an interconnection inverter device with a high-voltage specification in which an input voltage is comparatively high.

The invention claimed is:

1. An interconnection inverter device that includes an inverter for converting direct-current power of a direct-current power supply to alternating-current power to be supplied to an alternating-current power system, the interconnection inverter device comprising:
    a pair of buses including a positive bus that connects a positive terminal of the direct-current power supply to a positive terminal of the inverter and a negative bus that connects a negative terminal of the direct-current power supply to a negative terminal of the inverter;
    a pair of capacitors connected in series between the positive bus and the negative bus;
    a switch unit connected to any one of the positive bus and the negative bus;
    a pair of voltage monitor units each of which detects a terminal voltage of a corresponding one of the capacitors in the pair of capacitors; and
    a controller that controls the switch unit based on a terminal voltage detected by at least one of the voltage monitor units.

2. The interconnection inverter device according to claim 1, further comprising a converter that is connected to an input of the inverter, and that boosts and/or steps down each voltage stored in the pair of capacitors.

3. The interconnection inverter device according to claim 1, further comprising:
    a switching element that includes a first terminal, a second terminal, and a control terminal, wherein the first terminal is connected to an input terminal of the switch unit and the second terminal is connected to an output terminal of the switch unit; and
    a switching-element control circuit that is connected to the control terminal of the switching element and that controls conduction of the switching element, wherein
    the controller controls the switching-element control circuit based on the terminal voltage detected by at least one of the voltage monitor units.

4. The interconnection inverter device according to claim 3, wherein when the interconnection inverter device is to be stopped, the controller controls the switch unit to be turned off, and then controls the switching element to be turned off.

5. The interconnection inverter device according to claim 3, wherein when the interconnection inverter device is to be operated, the controller controls the switching element to be turned on, and then controls the switch unit to be turned on.

6. The interconnection inverter device according to claim 3, further comprising a resistor connected in series to either the first terminal or the second terminal of the switching element.

7. The interconnection inverter device according to claim 3, further comprising an output-voltage monitor unit that monitors an output voltage of the direct-current power supply, wherein when the output voltage monitored by the output-voltage monitor unit has exceeded a predetermined set voltage, the controller controls the switching element to be turned on.

8. An interconnection inverter device that includes an inverter for converting direct-current power of a direct-current power supply to alternating-current power to be supplied to an alternating-current power system, the interconnection inverter device comprising:
    a pair of buses including a positive bus that connects a positive terminal of the direct-current power supply to a positive terminal of the inverter and a negative bus that connects a negative terminal of the direct-current power supply to a negative terminal of the inverter;

a group of capacitors connected in series between the positive bus and the negative bus, wherein the group of capacitors includes at least three series-connected capacitors;

a switch unit connected to any one of the positive bus and the negative bus;

a group of voltage monitor units that includes at least one voltage monitor unit corresponding to each capacitor in the group of capacitors, each of the voltage monitor units detects a terminal voltage of a corresponding one of the capacitor in the group of capacitors; and a controller that controls the switch unit based on a terminal voltage detected by at least one of the voltage monitor units.

9. The interconnection inverter device according to claim 8, further comprising:

a switching element that includes a first terminal, a second terminal, and a control terminal, wherein the first terminal is connected to an input terminal of the switch unit and the second terminal is connected to an output terminal of the switch unit; and a switching-element control circuit that is connected to a control terminal of the switching element and that controls conduction of the switching element, wherein the controller controls the switching-element control circuit based on the terminal voltage detected by at least one of the voltage monitor units.

* * * * *